(12) United States Patent
Dietrich

(10) Patent No.: US 9,647,840 B2
(45) Date of Patent: *May 9, 2017

(54) METHOD FOR PRODUCING A SOFT TOKEN, COMPUTER PROGRAM PRODUCT AND SERVICE COMPUTER SYSTEM

(71) Applicant: BUNDESDRUCKEREI GMBH, Berlin (DE)

(72) Inventor: Frank Dietrich, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 4 days.

This patent is subject to a terminal disclaimer.

(21) Appl. No.: 14/437,906

(22) PCT Filed: Oct. 17, 2013

(86) PCT No.: PCT/EP2013/071749
§ 371 (c)(1),
(2) Date: Apr. 23, 2015

(87) PCT Pub. No.: WO2014/063990
PCT Pub. Date: May 1, 2014

(65) Prior Publication Data
US 2015/0270971 A1    Sep. 24, 2015

(30) Foreign Application Priority Data

Oct. 26, 2012  (DE) ........................ 10 2012 219 618

(51) Int. Cl.
*H04L 29/06* (2006.01)
*H04L 9/32* (2006.01)
(Continued)

(52) U.S. Cl.
CPC ............ *H04L 9/3228* (2013.01); *G06F 21/35* (2013.01); *G06F 21/42* (2013.01); *G06F 21/602* (2013.01);
(Continued)

(58) Field of Classification Search
CPC ... H04L 9/3228; H04L 63/0838; H04L 63/12; G06F 21/42
(Continued)

(56) References Cited

U.S. PATENT DOCUMENTS

2005/0015593 A1* 1/2005 Cheng ................ H04L 63/0815
713/168
2005/0188219 A1* 8/2005 Annic .................... H04L 12/24
726/22
(Continued)

FOREIGN PATENT DOCUMENTS

DE  10 2008 000 067  7/2009
DE  10 2008 040 416  1/2010
(Continued)

OTHER PUBLICATIONS

Zhang, "Achieving fine-grained access control in Virtual Organizations", Jun. 2007, Concurrency & Computation, vol. 19, p. 1333-1352.*
(Continued)

*Primary Examiner* — Taghi Arani
*Assistant Examiner* — Gregory Lane
(74) *Attorney, Agent, or Firm* — Richardt Patentanwalte PartG m

(57) ABSTRACT

The method relates to a method for generating a soft token, having the following: providing a secure element, wherein, in a protected storage area of the secure element, a secret key of a first asymmetric cryptographic key pair is stored, setting
(Continued)

up a first cryptographically secured connection between an electronic device and a service computer system, transmitting a request for the generation of the soft token from the electronic device to the service computer system via the first connection, generating a one-time password on the basis of the reception of the request by the service computer system, registering the one-time password as an identifier of the first connection by the service computer system, transmitting the one-time password from the service computer system to the electronic device via the first connection, issuing the one-time password via a user interface of the electronic device, setting up a second cryptographically stored connection between a user computer system and the service computer system, entering the one-time password into the user computer system, transmitting the entered one-time password from the user computer system to the service computer system via the second connection, verifying, by means of the service computer system, whether the registered one-time password is in agreement with the one-time password received via the second connection, and only if this is the case, reading at least one attribute stored in an ID token, generating the soft token by signing the at least one attribute and the public key of the first cryptographic key pair, transmitting the soft token via the first connection to the electronic device and/or transmitting the soft token via the second connection to the user computer system.

24 Claims, 8 Drawing Sheets

(51) Int. Cl.
    G06F 21/35 (2013.01)
    G06F 21/60 (2013.01)
    G06F 21/42 (2013.01)
(52) U.S. Cl.
    CPC ......... *H04L 63/04* (2013.01); *H04L 63/0838* (2013.01); *H04L 63/12* (2013.01)
(58) Field of Classification Search
    USPC .............................................. 713/168; 726/6
    See application file for complete search history.

(56) References Cited

U.S. PATENT DOCUMENTS

| 2009/0158033 | A1* | 6/2009 | Jeong ................... H04L 63/068 713/156 |
| 2009/0193250 | A1 | 7/2009 | Yokota et al. |
| 2010/0199086 | A1 | 8/2010 | Kuang et al. |
| 2010/0262834 | A1* | 10/2010 | Freeman ................ G06F 21/31 713/184 |
| 2011/0258452 | A1* | 10/2011 | Coulier ................... G06F 21/31 713/171 |
| 2011/0265159 | A1* | 10/2011 | Ronda ................. H04L 63/0853 726/6 |
| 2012/0084565 | A1* | 4/2012 | Wittenberg ........... H04L 9/3213 713/172 |
| 2012/0167186 | A1* | 6/2012 | Dietrich .................. G06F 21/34 726/6 |
| 2012/0174193 | A1 | 7/2012 | Dietrich |
| 2012/0185398 | A1* | 7/2012 | Weis ...................... G06Q 20/20 705/75 |
| 2013/0047223 | A1* | 2/2013 | Headley .............. H04L 63/0838 726/5 |
| 2013/0227291 | A1* | 8/2013 | Ahmed ............... H04L 63/0281 713/171 |
| 2013/0318354 | A1* | 11/2013 | Entschew ............. G06F 21/645 713/175 |

FOREIGN PATENT DOCUMENTS

| DE | 10 2008 042 262 | 4/2010 |
| DE | 10 2009 026 953 | 12/2010 |
| DE | 10 2009 027 681 | 1/2011 |
| DE | 10 2009 027 682 | 1/2011 |
| DE | 10 2009 027 686 | 1/2011 |
| DE | 10 2009 027 723 | 1/2011 |
| DE | 10 2009 046 205 | 5/2011 |
| DE | 10 2010 028 133 | 10/2011 |
| DE | 10 2011 082 101 | 3/2013 |
| EP | 1 868 131 | 12/2007 |

OTHER PUBLICATIONS

Schroder, M., "SAML Identity Federation und die eID-Funktionalitat des nPA", www.sar.informatik.hu-berlin.de/research/publications/SAR-PR-2011-08/saml_.pdf, Jun. 13, 2011, no translation available.

PCT International Search Report, EPO, PCT/EP2013/071749, Mar. 2, 2014.

Paquin et al., U-Prove Crytographic specification V1.1 Revision 3, http://research.microsoft.com/apps/pubs/default.aspx?id=166969, Dec. 2013.

Bundesamt fur Sicherheit in der Informationstechnik, "Technical Guideline TR-031121", https://www.bsi.bund.de/SharedDocs/Downloads/DE/BSI/Publikationen/TechnischeRichtlinien/TR03112/apil_teil7_pdf.pdf?_blob=publicationFile , Version 1.1.5 draft, Apr. 7, 2015.

BSI: Technical Guideline eID-Server, BSI TR-03130-1, Version 2.0.1, Jan. 15, 2014 (English version of BSI: "Technische Richtlinie eID-Server", Bundesamt fur Sicherheit in Der Informationstechnik, Bonn, vol. BSI TR-30130, No. Version 1.0 RCI, May 19, 2009, pp. 1-48, also attached).

Morgner, Frank, http://vsmartcard.sourceforge.net/npa/README. html , nPA Smart Card Library, Dec. 8, 2013.

* cited by examiner

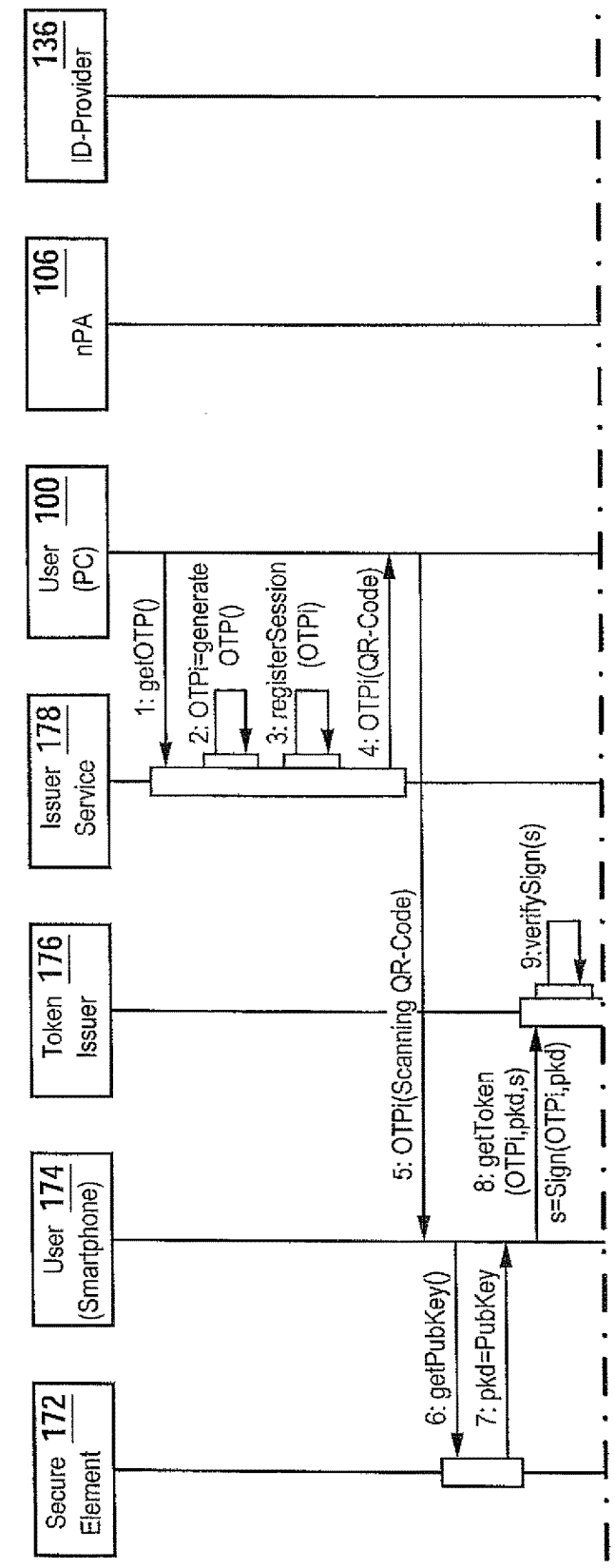

METHOD FOR PRODUCING A SOFT TOKEN, COMPUTER PROGRAM PRODUCT AND SERVICE COMPUTER SYSTEM

PRIORITY CLAIM

This application claims benefit of foreign priority in accordance with 35 U.S.C. 119(b) to German application No. 10 2012 219 618.8 filed Oct. 26, 2012.

BACKGROUND

The disclosure relates to a method for generating a soft token, a computer program product, a service computer system, and a data processing system.

The use of soft tokens, which are also referred to as software tokens, for authentication purposes, is known per se from the prior art. A disadvantage of soft tokens is that copies can be made thereof. This is a point of vulnerability for the misuse of soft tokens.

In particular, soft tokens based on the U-Prove standard, which are referred to as U-Prove tokens, are known from the prior art. Such a U-Prove token can be protected by hardware by distributing the private key of a U-Prove token between two devices (cf. U-Prove Technology Overview V1.1, Draft Revision 1, Microsoft Corporation 2011, chapter 6 on page 18).

A method for generating a soft token is disclosed in DE 10 2011 082 101. The method includes the use of a secure element.

BRIEF DESCRIPTION OF THE DRAWINGS

Embodiments of the disclosure are explained in greater detail in the following with reference to the drawings. In the drawings.

DESCRIPTION

Figure 1:
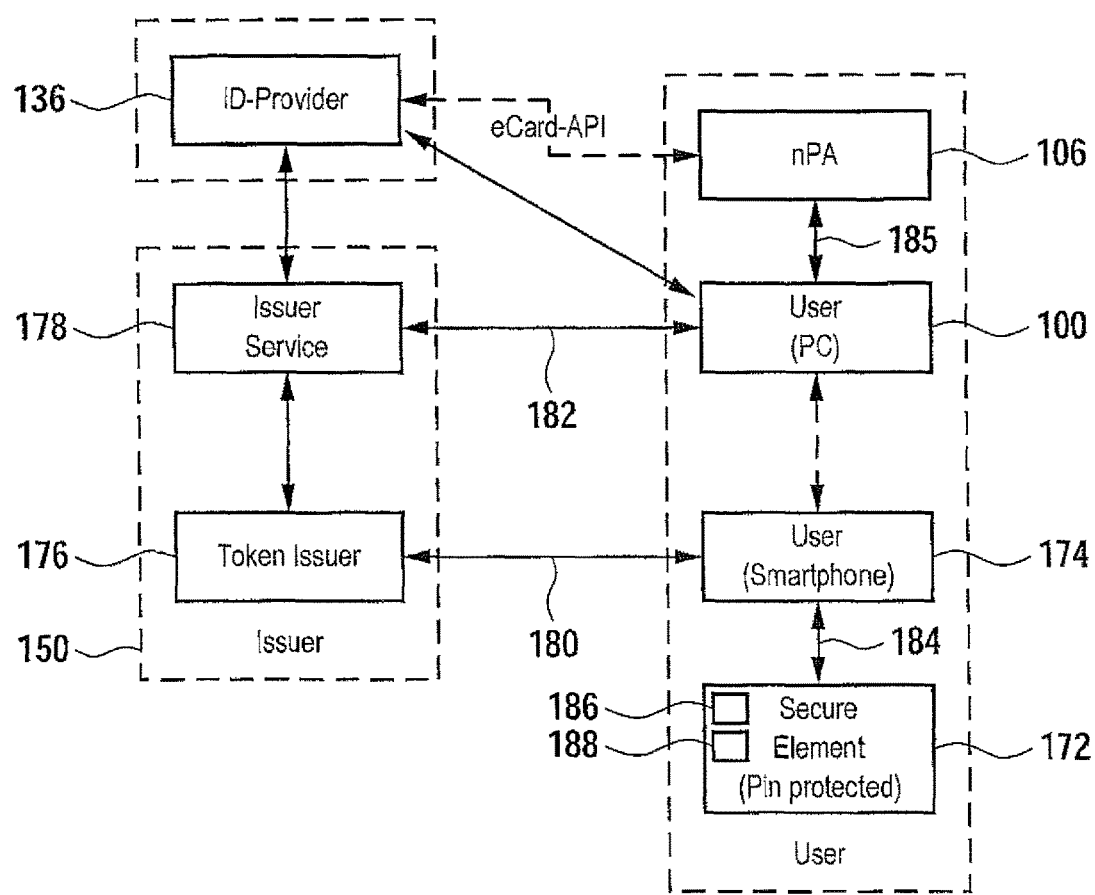
FIG. 1 shows a block diagram of a first embodiment of a data processing system according to the disclosure.

By comparison, the problem addressed by the disclosure is that of creating an improved method for generating a soft token, and a computer program product, a service computer system, and a data processing system.

The problem addressed by the disclosure is solved by the features of the independent claims. Embodiments of the disclosure are set forth in the dependent claims.

Embodiments of the disclosure are particularly advantageous, since an ID token of a user is used as the data source for generating the soft token, and the soft token is cryptographically linked to a secure element of the same user in order to thereby ensure maximum security while simultaneously ensuring easy handling.

According to the disclosure, a "soft token" refers, in particular, to signed data, which can be used to authenticate a user, in particular a U-Prove token. In particular, the signed data can contain one or more attributes of a user, which have been signed by a trustworthy entity.

According to the disclosure, a "secure element" is intended to mean, in particular, a device, which has at least one protected storage area, in which data are stored such that said data are protected against tampering and spying, such as, for example, a chip card, in particular a Subscriber Identity Module (SIM) card, a USB stick, a Trusted Platform Module (TPM), or another device having a storage area protected by hardware and/or software measures. For example, the secure element is designed in the form of a card such that a user can easily carry this with him.

According to an essential aspect of the disclosure, the secure element is designed to establish a local connection with the user computer system, wherein the local connection is a bidirectional ad hoc connection. To this end, the secure element can have not only an interface that is provided by default, such as, e.g., a contact-type interface for a chip card reader, but also an additional communication interface for establishing the local connection, such as, e.g., a Bluetooth or NFC interface, wherein this additional communication interface can be integrated into the secure element and can form a structural unit therewith.

In this case, an "ad hoc connection" is intended to mean a connection that is automatically set up by two terminal devices, i.e., the user computer system and the secure element in this case, with one another and, in fact, without a permanent infrastructure, in particular without wireless access points.

The wireless connection is preferably a wireless radio connection, in particular in the gigahertz range, in particular according to a Bluetooth standard or an NFC standard.

Embodiments of the disclosure are particularly advantageous, since a device- and manufacturer-independent universal solution is created, which makes it possible to implement the method for generating a soft token independently of the manufacturer, since a user computer system, in particular in an embodiment as a smartphone, generally has a Bluetooth interface anyway, which is used, according to the disclosure, for the communication between the user computer system and the secure element.

According to embodiments of the disclosure, the communication between the user computer system and the secure element takes place via the local connection with end-to-end encryption. This is particularly advantageous in the case of a radio communication, since interception or tampering of the communication is prevented in this manner.

According to the disclosure, a "cryptographically secured connection" refers to a connection in which the data transmitted via the connection are encoded in order to protect them against tampering and/or spying, in particular copying. An asymmetric or symmetric encryption method can be used to set up a cryptographically secure connection, in particular a Diffie-Hellman (DH) key exchange.

According to the disclosure, a "service computer system" refers to a computer system used to provide a service, namely the generation of a soft token for a user.

According to the disclosure, a "one-time password" (OTP) refers, in particular, to a one-time password or a one-time identifier, which is generated, e.g., with the aid of a password generator. An OTP is used for authentication and is valid for only a single operation, i.e., it cannot be used twice. In order to authenticate a user, this user must enter a correct one-time password.

According to the disclosure, a "user computer system" refers, in particular, to a personal computer (PC), a laptop computer, or another computer that belongs to a user, such as, e.g., an electronic device, which has the functionality of a mobile computer, in particular a smartphone or another portable computer.

According to the disclosure, an "ID token" refers, in particular, to a portable electronic device, such as, for example, a so-called USB stick, or to a document, in particular a document of value and/or a security document. The ID token has an electronic memory, in which at least one attribute is stored.

According to the disclosure, a "document" refers, in particular, to paper-based and/or plastic-based documents, such as, for example, identification documents, in particular passports, personal identification documents, visas and driver's licenses, vehicle registration documents, employee identification documents, health insurance cards, or other ID documents, as well as chip cards, payment means, in particular banknotes, bank cards, and credit cards, consignment notes, or other types of authorization, into which a data memory for storing the at least one attribute is integrated.

According to embodiments of the disclosure, the user is the owner of an ID token, such as, for example, an electronic identification document, in particular an electronic passport or an electronic personal identification document. In addition, the user has a secure element, such as a chip card, for example. The secure element has a protected memory area, in which a secret key of a first asymmetric cryptographic key pair is stored.

A first cryptographically secured connection is set up between an electronic device belonging to the user and a service computer system, by means of which the user requests that a soft token be generated.

The electronic device can be a mobile terminal device, in particular a mobile radio device, a mobile telephone, a smartphone, a portable computer, a user computer system, or another mobile, battery-operated terminal device having a communication interface to the secure element.

The communication interface is designed to set up the local connection with the secure element. Particularly preferably, the electronic device is a mobile telephone, in particular a so-called smartphone, and the secure element is a telecommunications chip card, in particular an SIM card, which is located in an integrated chip card reader of the electronic device, and which also has a wireless interface, for example a Bluetooth and/or NFC interface, wherein the local connection is set up via the additional wireless interface.

In response to receiving the request to generate the soft token, the service computer system generates a one-time password with the aid of a corresponding password generator and registers the generated one-time password as an identifier of the first connection for setting up a session. The one-time password is transmitted to the user's electronic device via the first connection and is output by the electronic device via a user interface. For example, the one-time password is displayed on a display of the electronic device such that a user can read the one-time password on the display.

A second cryptographically secured connection is set up between the user computer system and the service computer system. The user enters the one-time password, which was output via the user interface of the electronic device, into his user computer system such that this one-time password is transmitted via the user computer system to the service computer system via the second connection. In this case, the expression "transmission of the one-time password" is also intended to mean that the user computer system derives an identifier from the one-time password according to a predefined algorithm and it is this identifier, and not necessarily the one-time password itself, that is transmitted via the second connection.

A verification is then carried out, by means of the service computer system, to determine whether the registered and transmitted one-time password is in agreement with the one-time password, or with the identifier derived therefrom, received via the second connection. Only if this is the case, the at least one attribute is read from the user's ID token and the soft token is generated therewith, wherein the public key of the first cryptographic key pair is also incorporated into the generation of the soft token. The thusly generated soft token is then transmitted via the first connection to the electronic device and/or via the second connection to the user computer system belonging to the user, i.e., within the session, which has been successfully set up and which includes the first and second connections.

This is particularly advantageous, since this ensures that one and the same user is the actual owner of both the ID token and the secure element and that the attributes that are incorporated into the generation of the soft token also actually belong to this user.

According to an embodiment of the disclosure, the one-time password is displayed on the display of the electronic device or the user computer system in the form of a machine-readable optical pattern, in particular in the form of a one- or two-dimensional barcode, or as a two-dimensional barcode, in particular a QR code. The one-time password can be entered by the user in that the user takes a digital photograph of the machine-readable optical pattern, e.g., by means of a digital camera that is integrated in the electronic device or the user computer system. The machine-readable optical pattern is then automatically decoded, thereby rendering it unnecessary for the user to manually enter the one-time password. This has the advantage, in particular, that relatively long one-time passwords can be used, thereby further increasing the security of the method according to the disclosure.

According to one embodiment of the disclosure, the secure element has a freely readable memory area, in which a public key of the first key pair is stored. This public key is transmitted from the secure element to the electronic device via the local connection, i.e., not via a network connection, but rather via a contactless ad hoc connection, for example. The public key is then transmitted from the electronic device to the service computer system via the first cryptographically secured connection. The one-time password generated by the service computer system is encoded using this public key and the resultant cipher is transmitted from the service computer system to the electronic device via the first connection.

The encoded one-time password is then forwarded, via the local connection, from the electronic device to the secure element, where it is decoded by means of the secret key. The decoded one-time password is then transmitted from the secure element to the electronic device via the local connection such that the electronic device can output the one-time password via the user interface thereof.

Embodiments of the disclosure are particularly advantageous, since the soft token is cryptographically linked to the secure element such that the soft token has a level of trustworthiness that is similar or identical to that of the ID token without being physically connected to the secure element. For example, the soft token can be stored on the secure element itself, on the user's electronic device, the user computer system, or in another electronic memory, since the authentication of the user requires, in addition to the soft token, that the secure element be presented, for example in order to verify in a challenge-response protocol that the secure element is in the possession of the private key of the first key pair, the public key of which was incorporated into the generation of the soft token. Such a presentation of the soft token and the secure element for the purpose of authenticating the user can take place according to the U-Prove protocol, for example.

According to an embodiment of the disclosure, the service computer system comprises a first program component for generating the one-time password, for encoding the one-time password, and for generating the soft token. In particular, the first program component can therefore contain a password generator for generating the one-time password. The service computer system furthermore comprises a second program component for receiving the one-time password from the user computer system, wherein the first connection is set up between the electronic device and the first program component and the second connection is set up between the user computer system and the second program component.

According to an embodiment of the disclosure, only the user computer system is present on the user side, without a separate electronic device. For example, the user computer system can be a smartphone, which has the functionalities of a user computer system and a mobile telephone, such as an iPhone or iPad, for example. In this case, the first and second cryptographically secured connections would be set up, for example, as two different sessions between the service computer system and the user computer system.

According to an embodiment of the disclosure, the at least one attribute is read out of the ID token by means of an ID-provider computer system.

According to the disclosure, an "ID-provider computer system" refers, in particular, to a computer system, which has an authorization certificate specifying authorization to read out the at least one attribute from the user's ID token. The ID-provider computer system can be designed, for example, according to DE 10 2008 000 067 A1, DE 10 2008 040 416, DE 10 2008 042 262, DE 10 2009 026 953, DE 10 2009 027 723, DE 10 2009 027 681 and/or DE 10 2010 028 133.6.

In this case, a "certificate" refers to a digital certificate, which is also referred to as a public key certificate. A certificate is structured data used to assign a public key of an asymmetric cryptosystem to an identity, such as a person or a device, for example. For example, the certificate can correspond to the X.509 standard or another standard. This can be an SSL certificate or a TLS certificate, in particular.

In this case, an "authorization certificate" refers to a specification of access rights to attributes stored in the ID token. An authorization certificate can contain a reference to one or more certificates, in particular SSL or TLS certificates, which are assigned to the authorization certificate.

Embodiments of the disclosure are particularly advantageous, since the at least one attribute is read out of a particularly trustworthy ID token, for example an official document. Furthermore, it is particularly advantageous that central storage of the attributes is not required. Embodiments of the disclosure therefore make it possible to achieve a particularly high level of trustworthiness with regard to disclosing the attributes that belong to a digital identity, combined with optimal data security and extremely convenient handling.

According to an embodiment of the disclosure, the first and second cryptographically secured connections are each transport layer connections. For example, the first and second connections are both Transport Layer Security (TLS) or Secure Sockets Layer (SSL) connections. The third connection having end-to-end encryption between the ID token and the ID-provider computer system is set up on a higher layer, however, such as an application layer, for example.

According to an embodiment of the disclosure, the service computer system generates a Security Assurance Markup Language (SAML) object, which contains the attribute specification of the attributes to be read out of the ID token and the signature of the service computer system. The SAML object is transmitted to the ID-provider computer system. The ID-provider computer system contains an SAML logic component, i.e., a computer program for receiving and processing SAML objects.

According to an embodiment of the disclosure, the ID-provider computer system transmits the at least one attribute in the form of an SAML object to the service computer system after the ID-provider computer system has read out the at least one attribute from the ID token and has stored the read-out attributes in the SAML object initially received from the service computer system.

According to one example embodiment of the disclosure, the soft token is generated by the service computer system by means of a blind signature or as a U-Prove token.

According to an embodiment of the disclosure, a plurality of soft tokens can be generated for the same secure element. To this end, a separate asymmetric cryptographic key pair is assigned to each of the soft tokens. The secret key of this further key pair can be stored, e.g., in a memory of the electronic device, encoded with the public key pair of the first key pair. For example, the cipher of the secret key can be stored in a file system of the electronic device.

In another aspect, the disclosure relates to a computer program product, in particular a digital storage medium, in which executable program instructions for carrying out a method according to the disclosure are stored.

In another aspect, the disclosure relates to a service computer system and to a data processing system, which has at least one such service computer system and an ID-provider computer system. The individual functional components of these computer systems can be implemented on the same or different hardware units, which can be networked to one another, for example. The secure element and/or the ID token, the electronic device and/or the user computer system can also belong to the data processing system.

Elements of the following embodiments that correspond to one another are labelled with the same reference signs.

FIG. 1 shows a data processing system comprising a user computer system 100 and an ID token 106, such as an electronic identification document, for example, belonging to the same user. An ID-provider computer system 136 is used to read out at least one attribute, which is stored in the ID token. For example, the ID-provider computer system 136 can implement the eCard-API-Framework, as specified by the German Federal Office for Information Security in the technical guideline TR-03112.

A service computer system 150 is used to generate a soft token for the user. This soft token is supposed to be cryptographically linked to a secure element 172 belonging to the same user. Data can be exchanged between the service computer system 150 and the secure element 172 via an electronic device 174 belonging to the user.

This electronic device can be a separate mobile terminal device, such as a mobile telephone, for example, in particular a smartphone. When the electronic device 174 is designed as a smartphone, in particular, this can also perform the function of the user computer system 100, thereby rendering a separate user computer system 100 unnecessary. In place thereof, the functions of the user computer system 100 and the electronic device 174 are then carried out by one and the same device belonging to the user.

The service computer system 150 can have a first program component 176, which contains, e.g., a password generator for generating a one-time password, and which is used to generate the soft token. The service computer system 150 can have a second program component 178, which is used, in particular, to receive the one-time password from the user and to communicate with the ID-provider computer system 136.

The service computer system 150 can set up a first cryptographically secured connection 180 with the electronic device 174 and a second cryptographically secured connection 182 with the user computer system 100, e.g., between the program component 176 and the electronic device 174, and between the program component 178 and the user computer system 100.

The communication between the electronic device 174 and the secure element 172 takes place via a local connection 184, e.g., via a Bluetooth interface of the electronic device 174; likewise, the communication between the user computer system and the ID token 106 takes place via such a local connection 185.

The secure element 172 has a protected memory area 186, in which it is possible to store a secret key of a first asymmetric cryptographic key pair assigned to the secure element 172. The related public key of the first key pair can be stored in a freely readable memory area 188 of the secure element 172. An additional level of security can be achieved via the local connection 184 in that the communication between the electronic device 174 and the secure element 172 takes place according to a secure message method, for which the first asymmetric cryptographic key pair of the secure element 172 and another asymmetric cryptographic key pair, e.g., of the electronic device 174, can be used.

In order to provide particularly convenient handling, the secure element can be designed, e.g., as a key fob or a sticker or can be integrated into a piece of jewelry or, e.g., in a wristwatch.

A soft token, which is cryptographically linked to the secure element 172 by means of the ID token 106, can be generated in the following manner:

The connections 180 and 182 are set up. The user enters his request for the generation of the soft token such that this request is transmitted via the connection 180 to the service computer system 150, e.g., to the program component 176. In response thereto, the service computer system 150 generates a one-time password, which is transmitted to the user via the same connection 180 via which the request was received. The user must then enter this one-time password such that said one-time password is transmitted back to the service computer system via the other connection, i.e., the connection 182. If the one-time password generated by the service computer system 150 is in agreement with the one-time password that is received, or with an identifier derived therefrom on the user side, this is assurance that the two connections 180 and 182 belong to one and the same user.

Next, the service computer system 150 generates an attribute specification, which specifies which attributes are supposed to be read out of the ID token 106. This attribute specification is transmitted from the service computer system 150 to the ID-provider computer system 136, which then reads out the specified attributes from the ID token 106 in a manner known per se. This can take place according to the eCard-API-Framework, for example.

The ID-provider computer system 136 then responds to the attribute specification of the service computer system 150 with the read-out attributes, which, together with the public key of the secure element 172, are incorporated into the generation of the soft token by the service computer system 150. This soft token is then transmitted from the service computer system to the user via one of the connections 180 or 182.

The soft token can be generated according to the U-Prove standard, for example. In this case, the service computer system 150 functions as the issuer, wherein the U-Prove token is actually generated by the program component 176. The program component 178 provides an issuer service, e.g., in the form of a website, in which the user can enter the one-time password.

A particular advantage thereof is that intermediate storage of the soft token is not required, thereby increasing the security of the system. Another particular advantage of using the U-Prove standard is that the user can specify, on his or her own, which data he or she wants to reveal, and it is possible to avoid creating a profile, e.g., on the purchasing behavior of the user.

Figure 2:
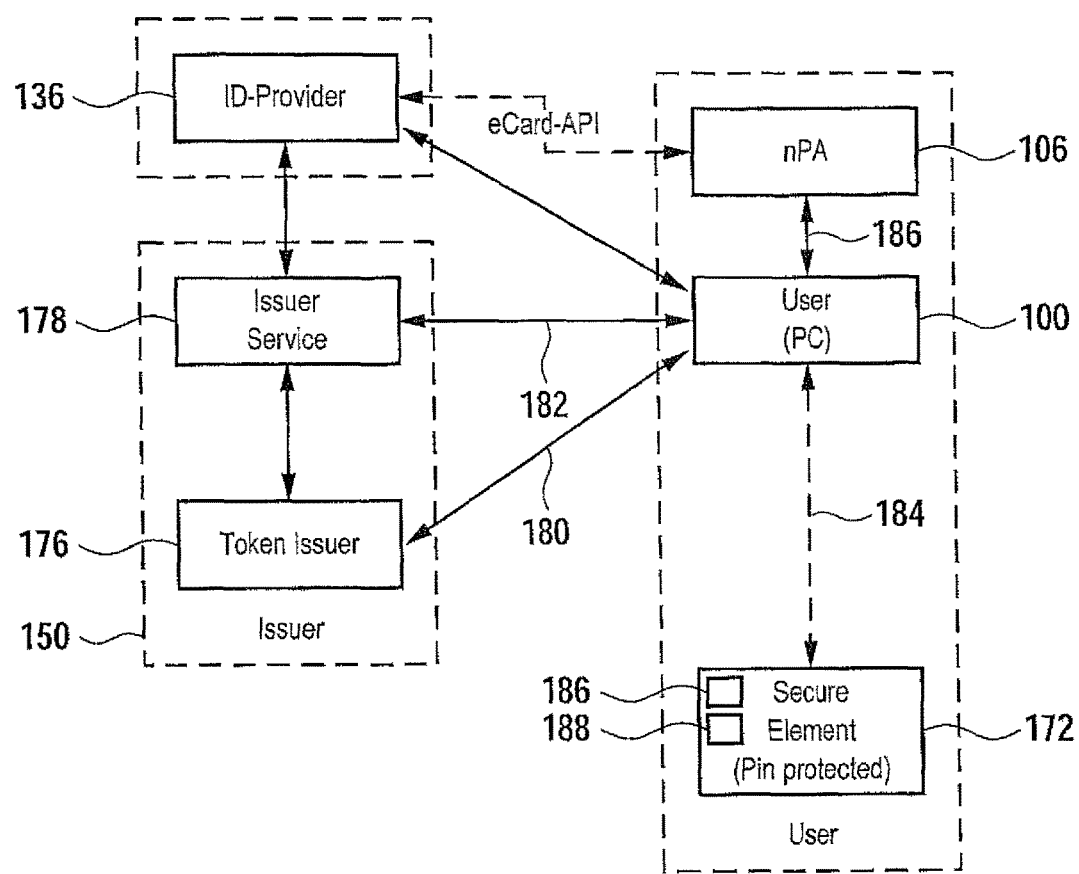
FIG. 2 shows a block diagram of a second embodiment of a data processing system according to the disclosure.

FIG. 2 shows another embodiment of a data processing system according to the disclosure, wherein, in this case, the user computer system 100 also performs the function of the electronic device 174. The two connections 180 and 182 to the user computer system 100 are therefore set up, e.g., in two different sessions, which run in parallel with one another. Analogously, it is also possible that the function of the user computer system 100 is performed by the electronic device 174, in particular when this is a so-called smartphone.

Figure 3:
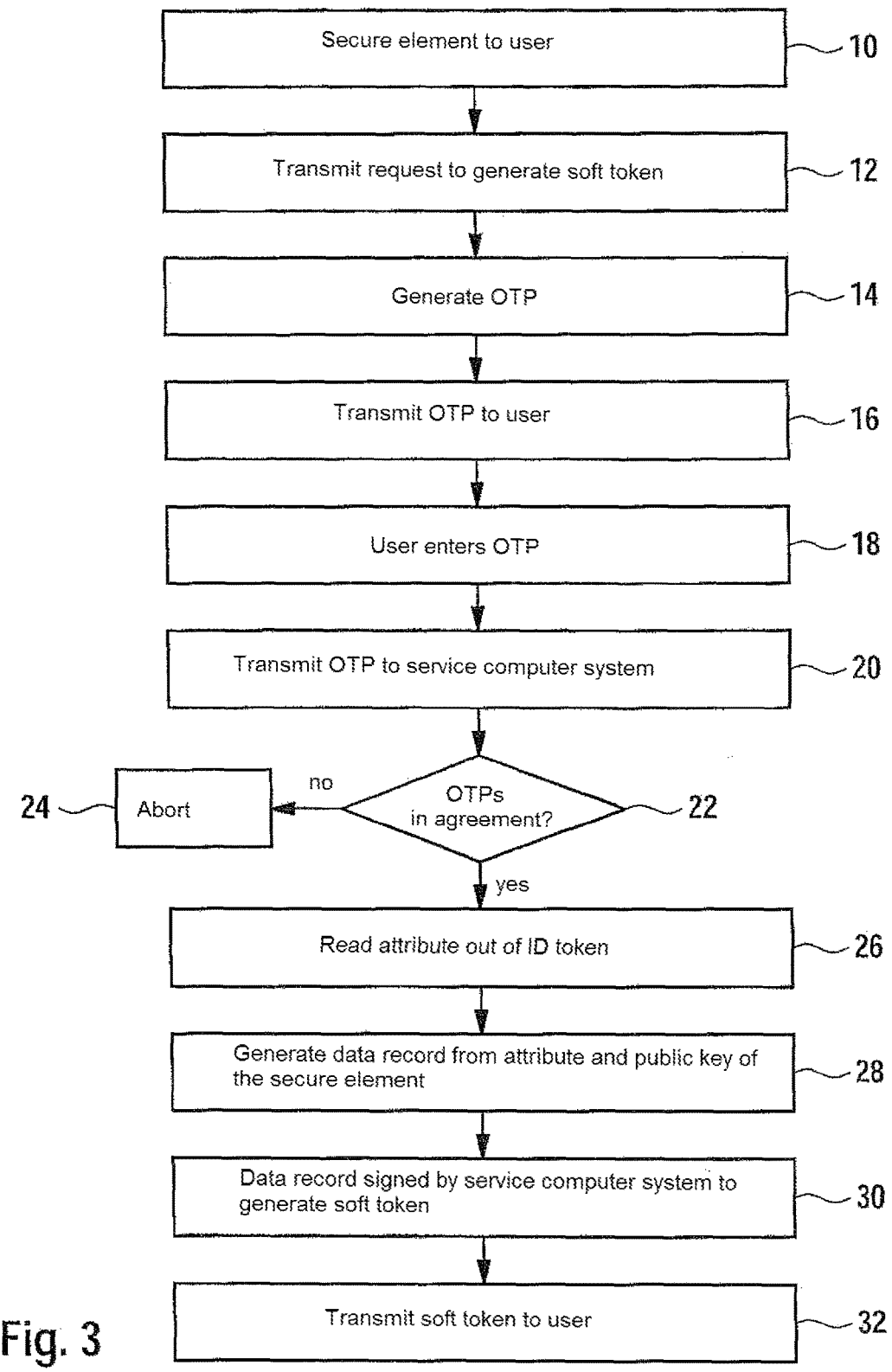
FIG. 3 shows a flow chart of an embodiment of a method according to the disclosure.

FIG. 3 shows a flow chart of an embodiment of a method according to the disclosure.

In Block 10, a secure element is made available to the user. For example, the user can freely acquire a secure element, which has not yet been personalized for the user. A soft token, in particular a U-Prove token, which is supposed to be linked to the secure element, is generated in the following manner:

In Block 12, the user transmits a request for the generation of the soft token to the service computer system, when then generates a one-time password in Block 14. In Block 16, this one-time password is transmitted from the service computer system to the user, specifically via a first cryptographically secured connection. In Block 18, the user must enter this received one-time password such that the one-time password or an identifier derived therefrom according to a predefined algorithm is transmitted from the user to the service computer system, specifically via a second cryptographically secured connection (Block 20). In Block 22, the service computer system carries out a verification to determine whether the generated one-time password is in agreement with the received one-time password or the identifier derived therefrom. If this is not the case, the process is aborted in Block 24.

If this is the case, in Block 26 one or more attributes are read out of the user's ID token, in order to generate a data record on the basis thereof, in Block 28, which said data record also contains the public key of the secure element that was made available to the user in Block 10.

In Block 30, this data record is signed by the service computer system, in order to thereby generate the soft token. In Block 32, the soft token is transmitted to the user, specifically via the first and/or the second connection.

Figure 4:
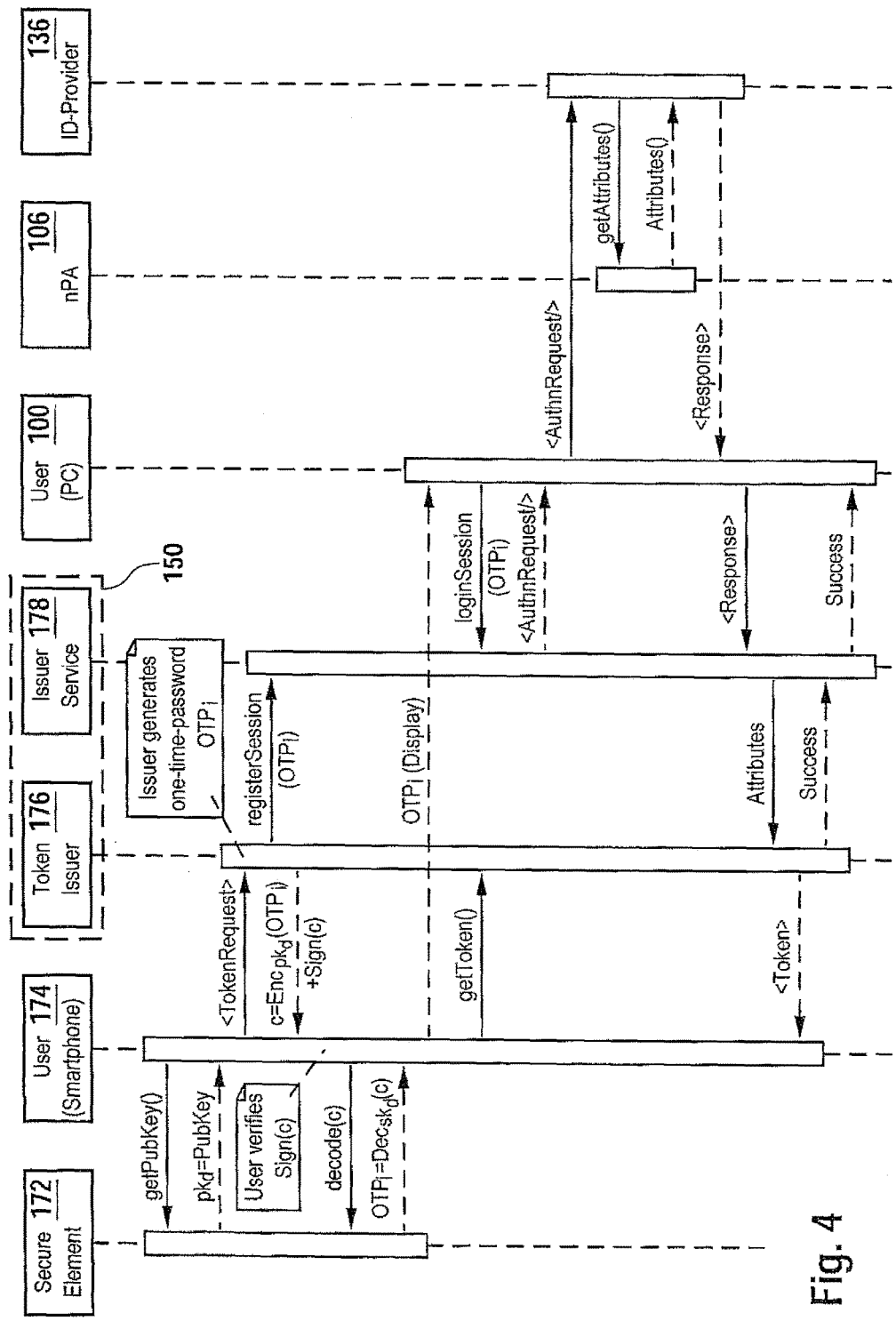
FIG. 4 shows a UML diagram of another embodiment of a method according to the disclosure.

FIG. 4 shows another embodiment of a method according to the disclosure, with reference to a UML diagram.

The user enters a request for the public key of the secure element 172 into his electronic device 174, said public key being stored in the freely readable memory area 188 of the secure element 172 (cf. FIG. 1). This request, "getPub-Key( )", is transmitted from the electronic device 174 to the secure element 172 via the local connection 184.

The secure element 172 then reads out the public key of the first cryptographic key pair assigned thereto from the memory area 188 and transmits this public key $pk_d$ to the electronic device 174 via the local connection 184.

The connection 180 is set up between the electronic device 174 and the service computer system 150, i.e., the program component 176 in this case, via which said connection the request for the soft token is transmitted from the electronic device 174 to the program component 176. The public key that was previously read out of the secure element 172 is also transmitted to the program component 176 via this cryptographically secured connection 180.

The program component 176 then generates a one-time password $OTP_i$ for this request, which was received via the connection 180. This $OTP_i$ is transmitted from the program component 176 to the program component 178 and is registered by this program component 178, i.e., is temporarily stored—"registerSession $(OTP_i)$".

Furthermore, the $OTP_i$ is encoded by the program component 176 by means of the public key $pk_d$, thereby resulting in the cipher c. Furthermore, the cipher c is digitally signed by the program component 176. The cipher c and its signature Sign(c) are transmitted to the electronic device 174 via the secured connection 180.

The electronic device 174 the verifies the signature of the cipher c. If the signature of the cipher c is valid, the electronic device 174 directs a request to decode the cipher c to the secure element 172, i.e., the request "decode (c)". The secure element 172 then decodes c by means of the secret key stored in the protected memory area 186 and transmits the result of this decoding operation, i.e., $OTP_i$, to the electronic device 174 via the local connection 184.

The electronic device 174 then displays $OTP_i$ on its display and, furthermore, directs a request "getToken( )" to the program component 176 in order to request the generation of the soft token. The user can read out the $OTP_i$ on the display of the electronic device 174 and enter this into the user computer system 100.

Instead of a manual entry, the $OTP_i$ can be captured mechanically from the display of the electronic device 174 by the user computer system 100. For example, the $OTP_i$ is displayed on the display of the electronic device 174 in the form of a machine-readable optical pattern, e.g., in the form of a QR code. This machine-readable optical pattern is captured by means of a digital camera of the user computer system 100 by taking a digital photograph and is automatically decoded such that the $OTP_i$ can be entered into the user computer system. The digital camera can be connected to the user computer system or can be an integral component of the user computer system 100. For example, the user computer system 100 can be a laptop computer having a webcam integrated into the housing.

The $OTP_i$ is transmitted via the secure connection 182 set up between the user computer system 100 and the program component 178. For example, the program component 178 generates a website, which is displayed on the user computer system 100, and in which the user enters the $OTP_i$, in order to "log in".

The program component 178 then compares the $OTP_i$ that was stored for the interim with the $OTP_i$ that was received from the user computer system 100 via the connection 182. If there is agreement, the program component 178 directs an authentication request "AuthnRequest/" to the ID-provider computer system 136, said authentication request being sent by means of a redirect of the user computer system 100 to the ID-provider computer system 136 via the connection 182. This authentication request can contain an attribute specification, which specifies the attributes that are supposed to be read out of the ID token 106 in order to access the soft token. This can take place in the form of an SAML object.

The ID-provider computer system directs a command to read the specified attributes, "get attributes ( )", to the ID token 106 and, in response, receives these attributes if the ID-provider computer system 136 can verify the read rights required therefor. The attributes read out by the ID-provider computer system 136 are then signed, and are forwarded, e.g., in the form of an SAML object, to the program component 178 via the user computer system 100. The program component 178 transfers, internally in the service computer system 150, the thusly received attributes to the program component 176. The program component 176 then generates a data record, which contains the received attributes and the public key of the secure element 172 that was read out of the memory area 188, and digitally signs said data record. The result is the requested soft token, which is then transmitted to the electronic device 174, e.g., via the connection 180.

Further soft tokens, each of which contains different attributes, can be generated for the secure element 172 in a similar manner. In order to do this, a further cryptographic key pair is generated for each of the soft tokens, e.g., by the electronic device 174, wherein the secret key of such a further key pair is encoded by means of the public key of the secure element 172, which was read out of the memory 188, in order to store the cipher of the secret key, e.g., in a file system of the electronic device 174. When the further soft token is presented, this cipher of the secret key is decoded by the secure element 172 in that the cipher is transmitted to the secure element 172 via the local connection 184.

Figure 5:
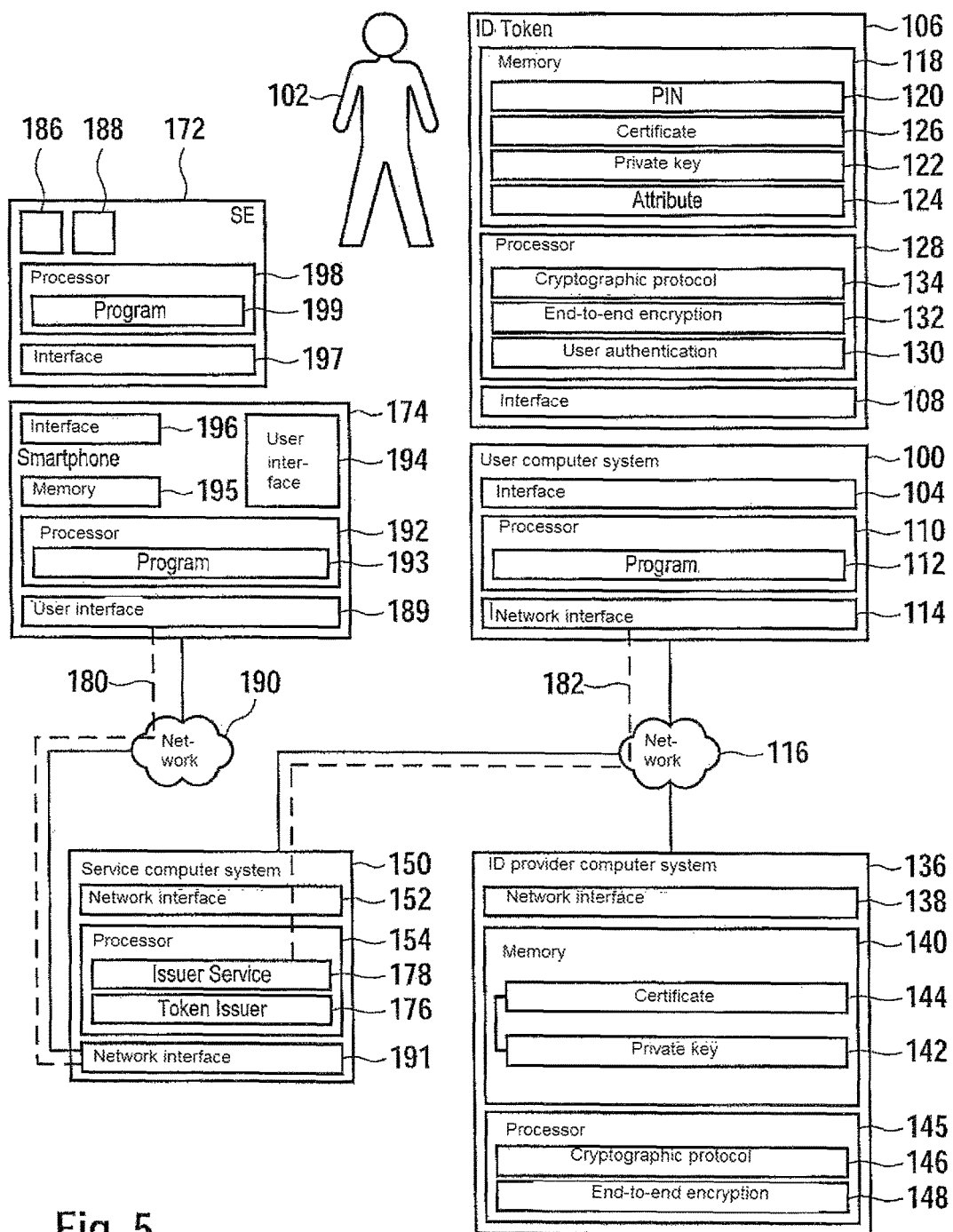
FIG. 5 shows a block diagram of another embodiment of a data processing system according to the disclosure.

FIG. 5 shows a block diagram of another embodiment of a data processing system according to the disclosure.

In the embodiment under consideration here, the program instructions 156 contain the program components 176 and 178.

In this case, the electronic device 174 is designed, e.g., as a mobile radio device, in particular as a smartphone, and has a network interface 189 to a mobile radio network 190, which functions, e.g., according to the GSM or UMTS standard. The service computer system 150 has a corresponding network interface 191 to the mobile radio network 190 such that the connection 180 can be set up via the mobile radio network 190.

Furthermore, the electronic device 174 has a processor 192 for executing program instructions 193 and a user interface 194, which contains, e.g., a display and a keyboard or a touchscreen. The electronic device 174 furthermore has an electronic memory 195 and an interface 196 for setting up the local connection 184 with the secure element 172, which has a corresponding interface 197. The secure element 172 furthermore has a processor 198 for executing program instructions 199. In order to engage the service computer system 150, i.e., in order to generate a soft token, the steps illustrated in the embodiments shown in FIGS. 1-4 are carried out.

For example, the user 102 enters a request for the generation of the soft token, via the user interface 194 of the electronic device 174, whereupon the public key is first read out of the memory area 188 via the local connection 184. By executing the program instructions 193, the "TokenRequest" and this public key are then transmitted via the connection 180 to the program component 176, which then generates the $OTP_i$, encodes this with the public key, and sends the signed cipher c to the electronic device 174 via the connection 180.

By executing the program instructions 193, the signature of c is verified and then the command "decode(c)" is sent to the secure element 172 via the local connection 184. This secure element responds with the encoded $OTP_i$, which is then displayed on the user interface 194 via execution of the program instructions 193.

The user 102 can then call up the website of the program component 178, for the purpose of which the connection 182 is set up between the program component 178 and the user computer system 100 via the network 116. The user 102 reads the $OTP_i$ on the display of the user interface 194 and enters this $OTP_i$ into the website of the program component 178 via the keyboard of the user computer system 100. If the generated $OTP_i$ and the thusly received $OTP_i$ are in agreement, the program component 178 generates the authentication request "AuthnRequest" (cf. FIG. 4).

In the embodiment under consideration here, this triggers the following sequence of steps for reading out the at least one attribute from the ID token 106:

1. Authentication of the user 102 with respect to the ID token 106.

The user 102 must authenticate himself with respect to the ID token 106. In an implementation using a PIN, the user 102 enters his PIN for this purpose, e.g., via the user computer system 100 or a chip card terminal connected thereto. By executing the program instructions 130, the ID token 106 then verifies the correctness of the entered PIN. If the entered PIN is in agreement with the reference value of the PIN stored in the protected memory area 120, the user 102 is considered to be authenticated. An analogous procedure can be carried out when a biometric feature of the user 102 is used to authenticate said user, in the above-described manner.

2. Authentication of the ID-provider computer system 136 with respect to the ID token 106.

To this end, a third connection is established between the ID token 106 and the ID-provider computer system 136 via the user computer system 100 and the network 116. For example, the ID-provider computer system 136 transmits its certificate 144 to the ID token 106 via this third connection. By means of the program instructions 134, a so-called challenge is then generated, i.e., a random number, for example. This random number is encoded with the public key of the ID-provider computer system 136 contained in the certificate 144. The resultant cipher is transmitted from the ID token 106 to the ID-provider computer system 136 via the third connection. The ID-provider computer system 136 decodes the cipher by means of the private key 142 thereof and thereby obtains the random number. The ID-provider computer system 136 returns the random number to the ID token 106 via the third connection. By executing the program instructions 134, a verification is carried out there to determine whether the random number received from the ID-provider computer system 136 is in agreement with the originally generated random number, i.e., the challenge. If this is the case, the ID-provider computer system 136 is considered to be authenticated with respect to the ID token 106. The random number can be used as a symmetric key for end-to-end encryption.

3. After the user 102 has successfully authenticated himself with respect to the ID token 106, and after the ID-provider computer system 136 has successfully authenticated itself with respect to the ID token 106, the ID-provider computer system 136 receives read access to read out one, several, or all of the attributes stored in the protected memory area 124. The scope of the read rights can be specified in the certificate 144 of the ID-provider computer system 136. On the basis of a corresponding read command, which the ID-provider computer system 136 sends to the ID token 106 via the third connection, the requested attributes are read out of the protected memory area 124 and are encoded via execution of the program instructions 132. The encoded attributes are transmitted via the third connection to the ID-provider computer system 136 and, there, are decoded via execution of the program instructions 148. As a result, the ID-provider computer system 136 is informed of the attributes read out of the ID token 106.

These attributes are signed by the ID-provider computer system by means of its certificate 144 and are transmitted to the service computer system 150 via the user computer system 100 or directly. As a result, the service computer system 150 is informed of the attributes read out of the ID token 106, thereby enabling the service computer system 150 to generate the soft token by means of these attributes.

Due to the need to authenticate the user 102 with respect to the ID token 106 and to authenticate the ID-provider computer system 136 with respect to the ID token 106, the necessary foundation of trust has been created such that the service computer system 150 can be certain that the attributes of the user 102 disclosed to him by the ID-provider computer system 136 are valid and are not adulterated.

The sequence of the authentication can differ depending on the embodiment. For example, it can be provided that the user 102 must first authenticate himself with respect to the ID token 106, followed by the ID-provider computer system 136. It is also possible, in principle, that the ID-provider computer system 136 must first authenticate itself with respect to the ID token 106, followed by the user 102.

In the first case, the ID token 106 is designed, e.g., such that it is released only if the user 102 enters a correct PIN or a correct biometric feature. This release must occur in order to start the program instructions 132 and 134 and, therefore, the authentication of the ID-provider computer system 136.

In the second case, the program instructions 132 and 134 can be started already if the user 102 has not yet authenticated himself with respect to the ID token 106. In this case, e.g., the program instructions 134 are designed such that the ID-provider computer system 136 cannot carry out a read access of the protected memory area 124 to read out one or more of the attributes until the successful authentication of the user 102 as well has been signaled by the program instructions 130.

The use of the ID token 106 is particularly advantageous, e.g., for E-commerce and E-government applications, specifically without media discontinuity and in compliance with laws, due to the foundation of trust that is established by the need to authenticate the user 102 and the ID-provider computer system 136 with respect to the ID token 106. Furthermore, it is particularly advantageous that central storage of the attributes of various users 102 is not required, thereby solving the data security problems that exist in the prior art. With respect to the convenience of implementing the method, it is particularly advantageous that prior registration of the user 102 is not required in order to engage the ID-provider computer system 136.

Figure 6:
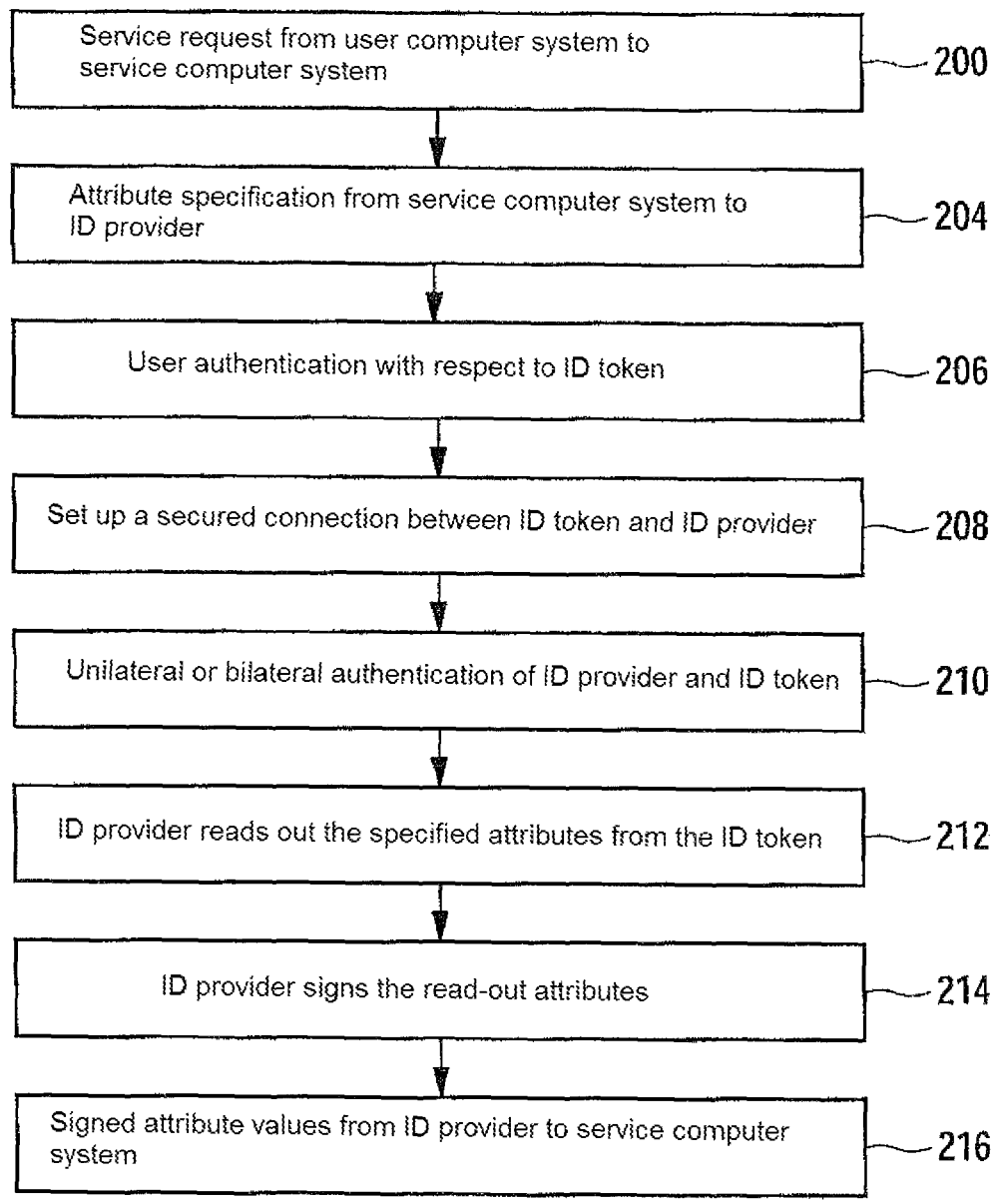
FIG. 6 shows a flow chart of a method for reading out the at least one attribute from the ID token, and FIGS. 7a and 7b of FIG. 7 shows a UML diagram of another embodiment of a method according to the disclosure.

FIG. 6 shows a corresponding method for reading the at least one attribute. In Block 200, the user computer system sends a service request for the generation of the soft token to the service computer system. To do this, for example, the user starts an Internet browser of the user computer system and enters a URL to call up a website of the service computer system. In this called-up website, the user then enters his service request, in which he or she can specify the attributes to be read. The attribute specification can also be fixedly predefined.

In Block 204, the attribute specification is transmitted from the service computer system to the ID-provider computer system, specifically either directly or via the user computer system.

In order to provide the ID-provider computer system with the opportunity to read out attributes from its ID token, the user authenticates himself with respect to the ID token in Block 206.

In Block 208, a connection is set up between the ID token and the ID-provider computer system. This is preferably a secured connection, e.g., according to a so-called secure messaging method.

In Block 210, at least one authentication of the ID-provider computer system with respect to the ID token is carried out via the connection set up in Block 208. In addition, an authentication of the ID token with respect to the ID-provider computer system can also be provided.

After the user as well as the ID-provider computer system have been successfully authenticated with respect to the ID token, the ID-provider computer system receives the access authorization, from the ID token, to read out the attributes. In Block 212, the ID-provider computer system sends one or more read commands to read out the attributes required according to the attribute specification from the ID token. The attributes are then transmitted by means of end-to-end encryption, via the secured connection, to the ID-provider computer system, and are decoded there.

The read-out attribute values are signed by the ID-provider computer system in Block 214. In Block 216, the ID-provider computer system sends the signed attribute values via the network. The signed attribute values reach the service computer system either directly or via the user computer system. In the latter case, the user can have the option to acknowledge the signed attribute values and/or to provide additional data. It can be provided that the signed attribute values, optionally with the additional data, are forwarded from the user computer system to the service computer system only after having been released by the user. This ensures the greatest possible transparency for the user with regard to the attributes sent from the ID-provider computer system to the service computer system.

The soft token can be stored, e.g., in the memory 195 of the electronic device 174 and/or in the memory area 188 of the secure element 172.

In order to authenticate the user 102, e.g., for E-government, E-commerce or M-commerce applications, or for purposes of access control, e.g., to a building, the user 102 can now use the secure element 172 in combination with the soft token, wherein a particularly high level of security is ensured due to the cryptographic link of the soft token to the secure element 172.

Figure 7B:
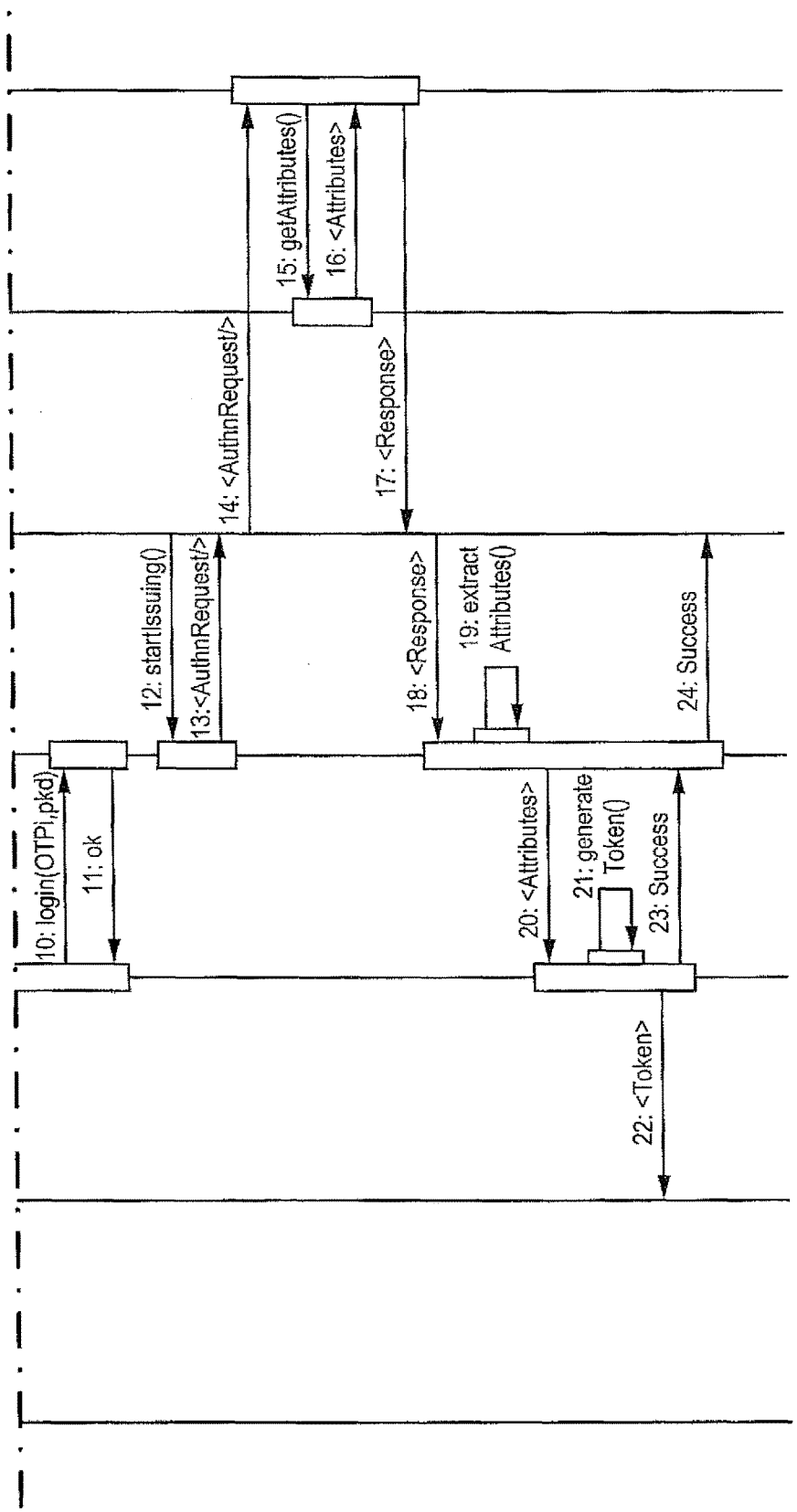

FIGS. 7a and 7b of FIG. 7 show another embodiment of the disclosure, which is analogous to the embodiment according to FIG. 4, wherein, in this case, the execution of the method is initiated by means of the user computer system 100. In step 1, a request to generate the soft token is entered in the service computer system 150, i.e., in the program component 178 in this case, by means of the user computer system 100, i.e., initially to generate a one-time password to set up the session required therefor. This is indicated as "getOTP( )" in FIG. 7a. The request can be entered into the service computer system 150, e.g., by calling up a website of the service computer system 150 by means of the user computer system 100, into which said website the user's particular request is entered via the browser of the user computer system 100. To do this, for example, first the cryptographically secured connection 180 is set up, specifically between the user computer system 100 and the service computer system 150 in the embodiment under consideration here, in order to transmit getOTP( ) via this connection 180.

In step 2, the user computer system 150 generates the requested one-time password $OTP_i$. The corresponding one-time password generator can be contained in the program component 178 in this case. Next, in step 3, the $OTP_i$ is stored as an identifier of the first cryptographically secured connection 180 set up between the user computer system 100 and the service computer system 150, i.e., the $OTP_i$ is registered to set up a session. In step 4, the $OTP_i$ is then transmitted from the user computer system 150 to the user computer system 100 via the first cryptographically secured connection 180, for example in the form of a QR code.

When the QR code is received, said QR code is shown on the display of the user computer system 100. The user can then use his electronic device 174 to mechanically capture the QR code shown on the display of the user computer system 100. An optical sensor integrated in the electronic device 174 or a digital camera can be used for this purpose. Particularly preferably, the electronic device 174 is a mobile telephone in this case, in particular a smartphone, having an integrated digital camera, i.e., a so-called camera phone. In this case, the user can use his camera phone to photograph the QR code shown on the display of the user computer system 100.

The QR code optically captured by means of the electronic device 174 is then decoded by the electronic device 174 by executing a corresponding program module in order to hereby enter the $OTP_i$ into the electronic device 174 (step 5).

In step 6, the electronic device 174 then requests the public key from the secure element 172 and receives this public key in step 7 in a manner analogous to the first two steps shown in FIG. 4. Furthermore, the $OTP_i$ is transmitted from the electronic device 174 to the secure element 172. The secure element 172 generates a signature s of the $OTP_i$ and transmits this signature s to the electronic device 174.

In step 8, the second cryptographically secured connection 182 is set up between the electronic device 174 and the service computer system 150. In step 8, furthermore, a signal is transmitted via the connection 182 from the electronic device 174 to the service computer system 150, i.e., the first program component 176 in this case, in order to transmit a command getToken($OTP_i$,pkd,s). By means of this signal, the generation of the soft token is requested, wherein the OTP$_i$, the public key of the secure element 172 pkd, and the signature s are transmitted together with this request.

In step 9, the signature s is verified by the program component 176 by means of the public key pkd. If the verification is successful, in step 10, the OTP$_i$ and, preferably, the public key pkd are transmitted from the program component 176 to the program component 178 and is compared with the registered OTP$_i$ by the program component 178. Furthermore, the public key pkd is stored in the service computer system 150, i.e., by the program component 178, for example, in order to permit this public key to be used subsequently in step 21 for the generation of the soft token. The public key pkd is stored with the OTP$_i$ as the identifier, for example, in order to assign the public key pkd to the session.

If there is agreement between the OTP$_i$, which was received via the second connection from the electronic device 174 to the service computer system 150 and which was entered into the program component 178 in step 10, with the previously registered OTP$_i$, the session has been successfully set up and the subsequent read access to the ID token 106 can be carried out. To the end, it can be necessary for the user to enter a corresponding confirmation into the service computer system 150, in step 12. The subsequent steps 13 to 18 are analogous to the corresponding steps of FIG. 4.

In step 19, the attributes are read out of the response of the ID-provider computer system 136 by means of the program component 178 and, in step 20, are transmitted to the program component 176. The program component 176 then generates the soft token by means of these attributes and the public key pkd received in step 8 and, in step 22, transmits the soft token to the electronic device 174, e.g., via the second connection. In steps 23 and 24, the user computer system 100 is notified that the soft token was successfully generated.

Some aspects and features of the disclosed embodiments are set out in the following numbered items:
1. A method for generating a soft token, comprising:
providing a secure element (172), wherein, in a protected storage area (186) of the secure element, a secret key of a first asymmetric cryptographic key pair is stored, setting up a first cryptographically secured connection (180) between an electronic device (174; 100) and a service computer system (150),
transmitting a request for the generation of the soft token from the electronic device to the service computer system via the first connection,
generating a one-time password on the basis of the reception of the request by the service computer system,
registering the one-time password as an identifier of the first connection by the service computer system,
transmitting the one-time password from the service computer system to the electronic device via the first connection,
issuing the one-time password via a user interface (194) of the electronic device, setting up a second cryptographically stored connection (182) between a user computer system (100; 174) and the service computer system,
entering the one-time password into the user computer system,
transmitting the entered one-time password from the user computer system to the service computer system via the second connection,
verifying, by means of the service computer system, whether the registered one-time password is in agreement with the one-time password received via the second connection, and only if this is the case, reading at least one attribute stored in an ID token (106), generating the soft token by signing the at least one attribute and the public key of the first cryptographic key pair, transmitting the soft token via the first connection to the electronic device and/or transmitting the soft token via the second connection to the user computer system, wherein a local connection (184) is set up between the user computer system and the secure element, wherein the local connection is a bidirectional ad hoc connection.
2. The method according to claim 1, wherein a public key of the first key pair is stored in a freely readable memory area (188) of the secure element, further comprising:
transmitting the public key from the secure element to the electronic device via the local connection (184),
transmitting the public key from the electronic device to the service computer system via the first cryptographically secured connection,
encoding the one-time password by means of the service computer system using the public key, wherein the encoded one-time password is transmitted from the service computer system to the electronic device via the first connection,
transmitting the encoded one-time password from the electronic device to the secure element via the local connection,
decoding the one-time password by mean of the secure element using the secret key of the first key pair,
transmitting the decoded one-time password from the secure element to the electronic device via the local connection for output by the electronic device.
3. The method according to claim 1 or 2, wherein the service computer system has a first program component (176) for generating the one-time password, for encoding the one-time password, and for generating the soft token, a second program component (178) for receiving the one-time password from the user computer system, wherein the first connection is set up between the electronic device and the first program component, and the second connection is set up between the user computer system and the second program component, further comprising:
transmitting the one-time password from the first program component to the second program component, wherein the second program component performs the verification to determine whether the one-time password received from the first program component is in agreement with the one-time password received from the user computer system via the second connection,
receiving the at least one attribute read out of the ID-token, by the second program component,
transmitting the at least one attribute from the second program component to the first program component.
4. The method according to claim 1, 2 or 3, wherein the electronic device is a mobile terminal device, in particular a mobile radio device, a mobile telephone, a smartphone, a portable computer, or another mobile, battery-operated terminal device having a communication interface for setting up the local connection with the secure element.
5. The method according to claim 1, 2 or 3, wherein the user computer system performs the function of the electronic device or wherein the electronic device performs the function of the user computer system.
6. The method according to any one of the preceding claims, wherein, in order to read out the at least one attribute from the ID token, further comprising: authentication of the user (102) with respect to the ID token,
authentication of an ID-provider computer system (136) with respect to the ID token, after successful authentication of the user and the ID-provider computer system with respect to the ID token, read access of the ID-provider computer system to the at least one attribute stored in the ID token via a third connection, transmission of the at least one attribute from the ID-provider computer system to the service computer system, wherein the third connection is set up between the ID token and the ID-provider computer system via the user computer system with end-to-end encryption.

7. The method according to claim 6, wherein the at least one attribute is signed by the ID-provider computer system and is transmitted to the service computer system via the user computer system.

8. The method according to claim 7, wherein the ID-provider computer system transmits the at least one attribute to the service computer system in the form of an SAML object.

9. The method according to any one of the preceding claims, wherein the soft token is generated by the service computer system by means of a blind signature or as a U-Prove token.

10. The method according to any one of the preceding claims, wherein a second asymmetric cryptographic key pair is assigned to the soft token, wherein the secret key of the second key pair, encoded with the public key of the first key pair, is stored in a memory (195) of the electronic device.

11. The method according to any one of the preceding claims, wherein the ID token is a document having an electronic memory (118) integrated in the document body, wherein the at least one attribute is stored in the electronic memory.

12. The method according to any one of the preceding claims, wherein the electronic device is designed as a computer system (100), in particular as a PC, and wherein the user computer system is designed as a mobile computer (174), in particular as a smartphone, wherein a public key of the first key pair is stored in a freely readable memory area (188) of the secure element, further comprising:
transmitting the public key from the secure element to the mobile computer (174) via the local connection (184),
transmitting the public key and the entered one-time password from the mobile computer (174) to the service computer system via the second cryptographically secured connection.

13. The method according to any one of the preceding claims, wherein the one-time password is output via display of a machine-readable optical pattern on a display, and wherein the one-time password is entered by mechanical capture of the optical pattern.

14. The method according to any one of the preceding claims, wherein the local connection is a wireless radio connection, and wherein the communication between the user computer system and the secure element takes place via the local connection with end-to-end encryption.

15. The method according to claim 14, wherein the wireless radio connection is set up in a frequency band in the gigahertz range, for example in a frequency band between 2.402 GHz and 2.480 GHz.

16. The method according to claim 14 or 15, wherein the radio connection is set up according to a Bluetooth or NFC standard.

17. The method according to claim 16, wherein pairing is carried out between the user computer system and the secure element in order to set up the wireless radio connection according to the Bluetooth standard.

18. A computer program product, in particular a digital storage medium, having executable program instructions for carrying out a method according to any one of the preceding claims.

19. A service computer system for generating a soft token linked to a secure element (172), having:

means (154, 176, 191) for setting up a first cryptographically secured connection (180) to an electronic device (174),
means (154, 176, 191) for receiving a request for the generation of the soft token from the electronic device via the first connection,
means (154, 176) for generating a one-time password on the basis of the receipt of the request,
means (154, 176, 191) for transmitting the one-time password to the electronic device via the first connection,
means (152, 154, 178) for setting up a second cryptographically secured connection (182) to a user computer system (100),
means (152, 154, 178) for receiving the one-time password from the user computer system via the second connection,
means (154, 178) for verifying whether the generated one-time password is in agreement with the received one-time password,
means (152, 154, 176, 178, 191) for generating the soft token by signing at least one attribute, which has been read out of an ID token, and a public key assigned to the secure element, and for transmitting the soft token to the electronic device via the first connection and/or to the user computer system via the second connection under the condition that the verification has confirmed that there is agreement between the generated one-time password and the received one-time password,
and having the secure element, wherein the secure element and the user computer system are designed to set up a local connection (184) between the user computer system and the secure element, wherein the local connection is a bidirectional ad hoc connection.

20. A data processing system comprising a service computer system (150) according to claim 19 and an ID-provider computer system (136), wherein the ID-provider computer system has
means (138) for receiving an attribute specification from the service computer system, wherein the attribute specification specifies at least one attribute,
means (142, 144, 145, 146) for authentication with respect to the ID token,
means (138, 145, 148) for reading out the at least one attribute from the ID token via a protected connection having end-to-end encryption,
wherein, before the at least one attribute can be read, a user assigned to the ID token and the ID-provider computer system have been authenticated with respect to the ID token.

21. The data processing system according to claim 16, comprising the secure element, wherein the secure element has a protected memory area (186), in which a secret key of the first key pair is stored.

LIST OF REFERENCE SIGNS

100 user computer system
102 user
104 interface
106 ID token
108 interface
110 processor
112 program instructions
114 network interface
116 network
118 electronic memory
120 protected memory area
122 protected memory area
124 protected memory area
126 memory 128 processor
130 program instructions
132 program instructions
134 program instructions
136 ID-provider computer system
138 network interface
140 memory
142 private key
144 certificate
145 processor
146 program instructions
148 program instructions
149 program instructions
150 service computer system
152 network interface
154 processor
156 program instructions
172 secure element
174 electronic device
176 first program component
178 second program component
180 first cryptographically secured connection
182 second cryptographically secured connection
184 local connection
185 local connection
186 protected memory area
188 freely readable memory area
189 network interface
190 mobile radio network
191 network interface
192 processor
193 program instructions
194 user interface
195 memory
196 interface
197 interface
198 processor
199 program instructions

What is claimed is:

1. A method for generating a soft token, the method comprising: providing a secure element, wherein, in a protected storage area of the secure element, a secret key of a first asymmetric cryptographic key pair is stored and wherein the secure element is associated with a user, setting up a first cryptographically secured connection between an electronic device of the user and a service computer system; transmitting a request for the generation of the soft token from the electronic device to the service computer system via the first connection; generating, by the service computer system, a one-time password on the basis of a reception of the request by the service computer system, where the one-time password is generated without knowledge of the secret key of the first asymmetric cryptographic key pair; registering the one-time password as an identifier of the first connection by the service computer system; transmitting the one-time password from the service computer system to the electronic, device via the first connection; issuing the one-time password via a user interface of the electronic device; setting up a second cryptographically stored connection between a user computer system and the service computer system; entering the one-time password into the user computer system; transmitting the entered one-time password from the user computer system to the service computer system via the second connection;
verifying, by means of the service computer system, whether the registered one-time password is in agreement with the one-time password received via the second connection, and if successfully verified, reading at least one attribute stored in an ID token; and generating the soft token by signing the at least one attribute and a public key of the first cryptographic key pair, transmitting the soft token via the first connection to the electronic device and/or transmitting the soft token via the second connection to the user computer system, wherein a local connection is set up between the user computer system and the secure element, wherein the local connection is a bidirectional ad hoc connection.

2. The method according to claim 1, wherein a public key of the first key pair is stored in a freely readable memory area of the secure element, the method further comprising:
transmitting the public key from the secure element to the electronic device via the local connection;
transmitting the public key from the electronic device to the service computer system via the first cryptographically secured connection;
encoding the one-time password by means of the service computer system using the public key, wherein the encoded one-time password is transmitted from the service computer system to the electronic device via the first connection;
transmitting the encoded one-time password from the electronic device to the secure element via the local connection;
decoding the one-time password by mean of the secure element using the secret key of the first key pair; and
transmitting the decoded one-time password from the secure element to the electronic device via the local connection for output by the electronic device.

3. The method according to claim 1, wherein the service computer system has a first program component for generating the one-time password, for encoding the one-time password, and for generating the soft token, a second program component for receiving the one-time password from the user computer system, wherein the first connection is set up between the electronic device and the first program component, and the second connection is set up between the user computer system and the second program component, the method further comprising:
transmitting the one-time password from the first program component to the second program component, wherein the second program component performs the verification to determine whether the one-time password received from the first program component is in agreement with the one-time password received from the user computer system via the second connection;
receiving the at least one attribute read out of the ID-token, by the second program component; and
transmitting the at least one attribute from the second program component to the first program component.

4. The method according to claim 1, wherein the electronic device is a mobile terminal device, in particular a mobile radio device, a mobile telephone, a smartphone, a portable computer, or another mobile, battery-operated terminal device having a communication interface for setting up the local connection with the secure element.

5. The method according to claim 1, wherein the user computer system performs one or more functions of the electronic device or wherein the electronic device performs one or more functions of the user computer system.

6. The method according to claim 1, wherein, in order to read out the at least one attribute from the ID token, the method further:
authenticating the user with respect to the ID token;
authenticating an ID-provider computer system with respect to the ID token; and
after successful authentication of the user and the ID-provider computer system with respect to the ID token, read accessing of the ID-provider computer system to the at least one attribute stored in the ID token via a third connection and transmitting the at least one attribute from the ID-provider computer system to the service computer system, wherein the third connection is set up between the ID token and the ID-provider computer system via the user computer system with end-to-end encryption.

7. The method according to claim 6, wherein the at least one attribute is signed by the ID-provider computer system and is transmitted to the service computer system via the user computer system.

8. The method according to claim 7, wherein the ID-provider computer system transmits the at least one attribute to the service computer system in the form of a Security Assurance Markup Language (SAML) object.

9. The method according to claim 1, wherein the soft token is generated by the service computer system by means of a blind signature or as a U-Prove token.

10. The method according to claim 1, wherein a second asymmetric cryptographic key pair is assigned to the soft token, wherein the secret key of the second key pair, encoded with the public key of the first key pair, is stored in a memory of the electronic device.

11. The method according to claim 1, wherein the ID token is a document having an electronic memory integrated in the document body, wherein the at least one attribute is stored in the electronic memory.

12. The method according to claim 1, wherein the electronic device is designed as a computer system, in particular as a PC, and wherein the user computer system is designed as a mobile computer, in particular as a smartphone, wherein a public key of the first key pair is stored in a freely readable memory area of the secure element, the method further comprising:
transmitting the public key from the secure element to the mobile computer via the local connection, and
transmitting the public key and the entered one-time password from the mobile computer to the service computer system via the second cryptographically secured connection.

13. The method according to claim 1, wherein the one-time password is output via display of a machine-readable optical pattern on a display, and wherein the optical pattern comprises a QR code.

14. The method according to claim 1, wherein the local connection is a wireless radio connection, and wherein the communication between the user computer system and the secure element takes place via the local connection with end-to-end encryption.

15. The method according to claim 14, wherein the wireless radio connection is set up in a frequency band between 2.402 GHz and 2.480 GHz.

16. The method according to claim 14, wherein the radio connection is set up according to a Bluetooth or NFC standard.

17. The method according to claim 16, wherein pairing is carried out between the user computer system and the secure element in order to set up the wireless radio connection according to the Bluetooth standard.

18. A computer program product, in particular a digital storage medium, having executable program instructions for carrying out a method according to claim 1.

19. A service computer system for generating a soft token linked to a secure element associated with a user, comprising:

means for setting up a first cryptographically secured connection to an electronic device associated with the user;
means for receiving a request for the generation of the soft token from the electronic device via the first connection;
means for generating a one-time password on the basis of the receipt of the request;
means for transmitting the one-time password to the electronic device via the first connection;
means for setting up a second cryptographically secured connection to a user computer system, wherein the user computer system is physically distinct from the electronic device associated with the user;
means for receiving the one-time password from the user computer system via the second connection;
means for verifying whether the generated one-time password is in agreement with the received one-time password;
means for generating the soft token by signing at least one attribute, which has been read out of an ID token, and a public key assigned to the secure element, and for transmitting the soft token to the electronic device via the first connection and/or to the user computer system via the second connection under the condition that the verification has confirmed that there is agreement between the generated one-time password and the received one-time password;
and having the secure element, wherein the secure element and the user computer system are designed to set up a local connection between the user computer system and the secure element, wherein the local connection is a bidirectional ad hoc connection.

20. A data processing system comprising a service computer system according to claim 19 and an ID-provider computer system, wherein the ID-provider computer system further comprises:
means for receiving an attribute specification from the service computer system, wherein the attribute specification specifies at least one attribute;
means for authentication with respect to the ID token; and
means for reading out the at least one attribute from the ID token via a protected connection having end-to-end encryption;
wherein, before the at least one attribute can be read, a user assigned to the ID token and the ID-provider computer system have been authenticated with respect to the ID token.

21. The data processing system according to claim 19, comprising the secure element, wherein the secure element has a protected memory are, in which a secret key of the first key pair is stored.

22. A service computer system for generating a soft token linked to a secure element associated with a user, having: a hardware processor, a first program component and a network interface in cooperative arrangement configured to set up a first cryptographically secured connection to an electronic device associated with the user by which a request for generation of the soft token is received from the electronic device, wherein a one-time password is generated by the hardware processor and the first program component upon receipt of the request by the first connection and wherein the hardware processor, the first program component and the network interface are configured in cooperative arrangement to transmit the one-time password to the electronic device via the first connection; a network interface and a second program component in cooperative arrangement with the hardware processor to set up a second cryptographically secured connection to a user computer system and to receive the one-time password from the user computer system via the second connection, wherein the hardware processor and the second program component are operable to verify whether the generated one-time password is in agreement with the received one-time password, and wherein the user computer system is physically distinct from the electronic device associated with the user; one or more of the first program component and the second program component further operable in cooperation with the hardware processor to generate the soft token by signing at least one attribute, which has been read out of an ID token, and a public key assigned to the secure element, and to transmit the soft token to the electronic device via the first connection and/or to the user computer system via the second connection under the condition that the verification has confirmed that there is agreement between the generated one-time password and the received one-time password; and the secure element, wherein the secure element and the user computer system are configured to set up a local connection between the user computer system and the secure element, wherein the local connection is a bidirectional ad hoc connection.

23. A data processing system comprising a service computer system according to claim 22 and an ID-provider computer system, wherein the ID-provider computer system further comprises: a network interface operable to receive an attribute specification from the service computer system, wherein the attribute specification specifies at least one attribute; a private key, a certificate, a hardware processor and first program instructions in cooperative arrangement configured for authentication with respect to the ID token; and second program instructions in cooperative arrangement with the hardware processor configured to read out the at least one attribute from the ID token via a protected connection having end-to-end encryption wherein, before the at least one attribute can be read, a user assigned to the ID token and the ID-provider computer system have been authenticated with respect to the ID token.

24. The data processing system of claim 23, wherein the first program instructions are a cryptographic protocol and the second program instructions are end-to-end encryption instructions.

* * * * *